United States Patent Office 3,065,207
Patented Nov. 20, 1962

3,065,207
POLYMER CONTAINING TERTIARY
AMINO RADICAL
Raymond J. Andres, Newport Beach, Calif., assignor to
E. I. du Pont de Nemours and Company, Wilmington,
Del., a corporation of Delaware
No Drawing. Filed Jan. 30, 1961, Ser. No. 85,447
14 Claims. (Cl. 260—75)

This invention relates to a synthetic condensation polymer. More particularly, it is concerned with a synthetic condensation polymer containing a bis-(carbobenzyl) tertiary amino radical dye site.

An attempt to incorporate amino nitrogen as a dye site recurring unit in synthetic fiber-forming condensation polymers poses two problems. If the amino dye site recurring unit contains free hydrogen, cross-linking occurs which tends to make the product hard, brittle, insoluble and infusible. Compounds containing tertiary nitrogen are generally unstable and deteriorate under high temperature condensation conditions, giving polymers of too low a molecular weight to be satisfactory for fiber-forming purposes.

It is an object of the present invention to provide a synthetic condensation polymer containing a bis-(carbobenzyl) tertiary amino radical dye site.

Another object is to provide a shaped article from a fiber-forming synthetic condensation polymer which contains bis-(carbobenzyl) tertiary amino radicals as acid dye site acceptor groups rendering such structures dyeable with acid and direct dyes.

Other objects will become apparent in the course of the following specification and claims.

These objects are accomplished by the present invention which provides a synthetic linear condensation polymer selected from the group consisting of (A) a polycarbonamide wherein the recurring amide linkages are an integral part of the main polymer chain, and (B) a polyester of a diol and a member selected from the group consisting of terephthalic acid and a mixture of dicarboxylic acids of which terephthalic acid comprises at least about 90%, said condensation polymer having an inherent viscosity of at least about 0.1 and containing as an integral part of the polymer chain a divalent radical of the formula:

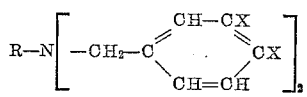

wherein one X is H and the other is

and R is selected from the group consisting of an aliphatic and a cycloaliphatic radical and wherein said divalent radical is attached into the polymer chain by the

linkages. The tertiary amino nitrogen of the above divalent radical is present in an amount of from about 0.05% to about 4.3% by weight of the condensation polymer. In a preferred embodiment, the R radical contains less than 11 carbon atoms, and sufficient bis-(carbobenzyl) tertiary amino radical is used to provide at least about 0.10% tertiary amino nitrogen in the polymer.

Dye sites of this character may be incorporated within a condensation polymer by employing an acid (or derivitive thereof) of the formula:

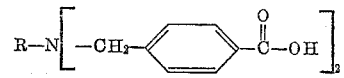

or

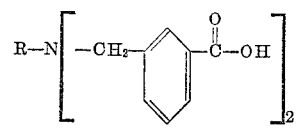

wherein R has the definition as set forth above, as the diacid component or as part of the diacid component of the polymerization reaction. These materials may be prepared by conventional methods such as for instance by reacting omega-chloro-p-toluic acid (or the corresponding meta-acid) with methyl amine in the presence of an acid acceptor, or by acid hydrolysis of the corresponding dinitrile which is described in the literature (Baker, J. W., "Jour. Chem. Soc.," Part I, 1929, 1205–1216). The meta-diacid compounds are preferred for this invention.

The following examples are cited to illustrate a typical method of preparing the amino diacids. Similar diacids may be prepared by the same procedure using different amines as reactants.

Example I

Omega-chloro-p-toluic acid is prepared by passing chlorine into a solution of 136 parts of crude p-toluic acid dissolved in 400 to 450 parts of ortho-dichlorobenzene maintained at a temperature of 120 to 130° C. in the presence of ultra violet light. The chlorine feed is stopped when 35.5 parts of chlorine have been absorbed. The crystalline reaction product is separated from the cooled solution and washed with cold benzene.

1705 parts of washed omega-chloro-p-toluic acid are dissolved in a mixture of 1600 parts of absolute alcohol, 100 parts of water and 77.6 parts of monomethylamine. After standing 16 hours at room temperature the solution is concentrated under vacuum to remove the alcohol and excess methylamine. The residue is added to 1,000 parts of an aqueous solution containing 210 parts of sodium bicarbonate. This solution is heated to boiling and 6 N sulfuric acid is added slowly until the mass has a final pH of about 6. The dicarboxylic acid precipitates as a white crystalline solid and is filtered from the cooled solution. It is washed and dried. A yield of about 85% is obtained. After recrystallization from 4 parts of a mixture of 2 parts water and 2 parts of dimethylformamide, the product melts between 280 and 283° C. It contains 5.0% nitrogen.

Example II

A stream of chlorine is passed through 272 parts of m-toluic acid and 615 parts of o-dichlorobenzene at 120–130° C. The chlorination is catalyzed by irradiation from a 500-watt incandescent light. After 71 parts of chlorine are absorbed, the mixture is cooled and filtered. A yield of 277 parts of omega-chloro-m-toluic acid is obtained.

A solution of 314.5 parts of this acid, 182 parts of cyclohexylamine, and 273 parts of triethylamine in 1800 parts of ethanol is stirred overnight at room temperature. An aqueous solution containing 180 parts of sodium hydroxide is added. The mixture is evaporated to remove most of the alcohol and triethylamine and is then made up to 1500 parts (by volume) by addition of water. On adjustment of the pH to 3.8, a yield of 195 parts of crude bis-(m-carboxybenzyl) cyclohexylamine is obtained, which is purified by recrystallization from about 90% aqueous dimethylformamide.

The following example illustrates the preparation of a related diacid by acid hydrolysis of the dinitrile.

Example III 625 parts of omega-chloro-p-tolunitrile and 235 parts of isopropylamine are dissolved in 1250 parts of ethanol and warmed cautiously with stirring to initiate reaction. Cooling facilities are thereafter employed to control the rate of reaction and an additional 235 parts of isopropylamine is added from a drip funnel at a rate which will maintain refluxing of the solution. Upon complete addition of the isopropylamine the reactants are heated at reflux for 20 hours. The alcohol is removed by heating under reduced pressure and 2000 parts of benzene are added to the residue. The mixture is then stirred thoroughly with a solution of 200 parts of sodium hydroxide in 1000 parts of water, after which the organic layer is separated. The aqueous layer is extracted twice with benzene and the combined organic portions washed once with cold water, dried over sodium sulfate and distilled at reduced pressure. A yield of 480 parts of p-cyanobenzylisopropylamine, B.P. 110–120° C. (.03 mm.) is obtained. The residue from the distillation is dissolved in 500 parts of hexane containing sufficient absolute alcohol to bring about complete solution at the boil, treated with activated carbon and cooled.

A mixture of 675 parts of the p-cyanobenzylisopropylamine so prepared and 445 parts of omega-chloro-p-tolunitrile is slowly warmed with stirring until the temperature is about 85° C. at which point the reaction proceeds with a gradual increase in temperature and crystals soon begin to form. After allowing to stand for one-half hour the solid reaction mixture is melted and heated to 200° C. for a period of one-half hour. After cooling to 80° C. the reaction mixture is added to a mixture of benzene and water after which a solution of 150 parts of sodium hydroxide in water is added and the mixture stirred thoroughly. The layers are separated and the water layer extracted twice with benzene. The combined organic portions are washed once with cold water, dried over sodium sulfate and evaporated at reduced pressure. The residue is dissolved in hexane containing absolute alcohol and the solution treated with activated carbon. Upon cooling, 528 parts of dinitrile crystallizes out and is collected. By concentration and cooling of the mother liquor an additional 170 parts of product is obtained, giving a total yield of 695 parts.

A mixture of 875 parts of the dinitrile and 2840 parts of concentrated hydrochloric acid is slowly warmed with stirring until the reaction commences. Some external cooling is necessary at first to prevent foaming. After the initial reaction has subsided, the mixture is heated at the reflux for seven hours, during which time the free acid precipitates out. The reaction mixture is diluted with an equal volume of cold water. The product is dissolved in sodium hydroxide solution, treated with activated carbon, cooled thoroughly and reprecipitated with dilute HCl. After collecting on a filter and washing with cold water it is thoroughly dried in a vacuum oven at 70° C. The yield is 940 parts.

In the preparation of polymeric materials, it is often convenient to proceed by way of ester interchange in accordance with conventional procedures. A phenyl ester of the diacid of Example III can be formed by reacting it with thionyl chloride and condensing with phenol in the presence of an anhydrous acid acceptor. The methyl ester may be prepared by refluxing the diacid with methanol in the presence of dry hydrogen chloride.

The amino diacid, prepared as described above, may be incorporated in fiber-forming condensation polymers by employing it as a portion of the diacid or diacid derivative reactant in a conventional condensation polymerization. Such polymerizations are described in Whinfield and Dickson, United States Patent 2,465,319, and Carothers, United States Patent 2,130,948. Typical procedures are exemplified below.

Example IV 18.2 parts of terephthalic dimethylester, 2.12 parts of bis-(p-carbophenoxybenzyl) methylamine, 15 parts of ethylene glycol, 0.0054 part PbO, and 0.018 part of $CaH_2$ are heated for 3 hours in a bath at a temperature of 218° C. The pressure is then gradually reduced to 0.5 mm. mercury and heating is continued for an additional 8 hours at the same temperature with stirring in a nitrogen atmosphere. The temperature is thereafter raised to 273° C. and heating is continued at this temperature for 5 hours. The product is light in color, has an inherent viscosity of 0.45, contains 0.25% nitrogen and has a polymer stick temperature of 220° C. It is dried at 100° C. in vacuum for 12 hours and extruded at 230° C. through a spinneret having a single orifice 0.009 inch in diameter. The yarn is drawn 3.2 times its extruded length at a temperature of 75° C.

A sample of the spun yarn is placed for one hour into a 100° C. dye bath which contains 5% Pontacyl Rubine R (Colour Index No. 179) and 5% sulfuric acid (based on the weight of the yarn) and 2% m-cresol based on weight of the dye bath, whereby the ratio of dye bath to fiber is 50:1. The dyed sample is scoured at 70° C. in a ½% soap solution for ½ hour. It is deeply colored and has good fastness to light.

Example V 18.2 parts of terephthalic dimethylester, 2.2 parts of bis-(p-carbophenoxybenzyl) isopropylamine, 15 parts of ethylene glycol, 0.0054 part PbO, and 0.018 part of $CaH_2$ are heated for 3 hours at a temperature of 218° C. The pressure is then gradulally reduced to 0.5 mm. mercury and the reaction mass is heated for an additional 5 hours at 273° C. in a nitrogen atmosphere. The product is similar in appearance to that of Example IV. It has an inherent viscosity of 0.42, a polymer stick temperature of 220° C. and contains 0.29% nitrogen.

A yarn is spun from this polymer following the procedure of Example IV. Separate samples of the yarn are dyed using the following dyes:

Pontacyl Rubine R (Colour Index #179)
P.L. Yellow GG (Colour Index #636)
Anthraquinone Blue SWF (Prototype of Colour Index #12)

In each instance a one gram sample of the yarn is immersed in a 40:1 ratio (bath:fiber) dye bath containing 5% of the dye and 5% sulfuric acid (each based on the weight of the fiber), and 2% m-cresol (based on the weight of the bath), for a period of one hour and at a temperature of 100° C. Upon removal from the dye bath, excess liquid is removed by squeezing and the sample is scoured at 70° C. in a ½% aqueous soap solution for ½ hour. It is dyed to deep shades in each instance. Commercial poly(ethylene terephthalate) yarn is colored only to light shades under the same dyeing conditions.

Example VI 17.3 parts of terephthalic dimethylester, 1.15 parts of dimethylsebacate, 2.12 parts of bis-(p-carbophenoxybenzyl) isopropylamine, and 15.0 parts of ethylene glycol are heated for 4 hours in a bath at a temperature of 218° C. The pressure is then gradually reduced to 0.5 mm. mercury and heating is continued for 5½ hours at 260° C. in a nitrogen atmosphere. The product has essentially no color, an inherent viscosity of 0.36, a polymer stick temperature between 205 and 210° C. and a nitrogen content of 0.56%.

The procedure of Example IV is followed to prepare a yarn. The yarn prepared dyes readily to deep shades following the procedure of Example IV, even in the absence of a carrier such as m-cresol.

Example VII 18.2 parts of terephthalic dimethylester, 1.5 parts of bis-(p-carbomethoxybenzyl) isopropylamine, 15 parts of ethylene glycol, 0.0054 part PbO, and 0.018 part of CaH₂ are heated for 4 hours at a constant temperature bath at 218° C. The pressure is gradually reduced to 0.5 mm. mercury after which the temperature is raised to 273° C. where it is held for seven hours. During this period the reaction mass is agitated and maintained in an atmosphere of hydrogen. The product has little or no color and has an inherent viscosity of 0.47 and contains 0.33% nitrogen.

Yarns prepared from the polymer following the procedure of Example IV dye from moderate to deep shades in boiling aqueous baths containing acid or direct dyestuffs, the depths of shade being dependent upon the specific dyestuff and whether or not an assistant such as m-cresol is employed.

The dye sites of bis-(carbobenzyl) tertiary amino radicals can be incorporated within a yarn by the copolymerization procedures exemplified above or alternatively they may be polymerized into a second polymer which may or may not be a fiber-forming polymer which is thereafter blended into a fiber-forming condensation polymer. In such procedures, it is particularly advantageous to polymerize the tertiary amino di-acid with a tertiary amino diol or tertiary amino di-primary amine. Such procedures are exemplified in Examples VIII and IX cited below.

Example VIII 1.61 parts of N-butyldiethanolamine and 2.25 parts of bis-(p-carbophenoxybenzyl) methylamine are heated for 24 hours at 200° C. under reduced pressure (about 0.1 mm. mercury) in a nitrogen atmosphere and with constant stirring. A pale yellow polymer having a melting point of 50–55° C., an inherent viscosity of 0.10 and containing 6.7% nitrogen (3.35% nitrogen in bis-(carbobenzyl) methylamine radicals) is recovered.

One part of the polymer prepared as described above is melt blended into 11 parts of poly(ethylene terephthalate), having an inherent viscosity of 0.65, prepared in accordance with Example IX of United States Patent 2,647,104, at 273° C., thoroughly mixing the melts for 15 minutes. The polymer blend has an inherent viscosity of 0.50, a polymer melt temperature of 225 to 230° C. and contains 0.54% nitrogen (0.27% nitrogen in bis-(carbobenzyl) methylamine radicals).

A yarn is spun from the polymer blend in accordance with the procedure and employing the equipment described in Example IV. A sample of this yarn is dyed by immersion in a 50:1 ratio (bath:fiber) dye bath containing 5% Pontacyl Rubine R (C.I. #179), 5% sulfuric acid (both based on the yarn weight) and 2% m-cresol (based on the weight of the dye bath) for a period of one hour at 100° C. Upon removal from the dye bath, excess liquid is removed by squeezing and the sample is scoured at 70° C. for one-half hour in a ½% aqueous soap solution. The yarn is dyed a deep red color (completely exhausting the dye bath) and possesses a light fastness rating of better than 20 hours on the Atlas Fade-Ometer.

Example IX 4.2 parts of N-(α-methylbenzyl) diethanolamine, 4.8 parts of bis-(carbophenoxybenzyl) isopropylamine and 0.0005 part of PbO are heated for 43 hours at 225° C. in an atmosphere of nitrogen under a reduced pressure of 0.1 mm. with constant stirring. The product has a light yellow color, an inherent viscosity of 0.20 and a polymer melt temperature of 75 to 80° C.

The blending procedure of Example VIII is followed to blend 1 part of the polymer prepared as described above with 13 parts of poly(ethylene terephthalate). The blend has a pale yellow color, an inherent viscosity of 0.53, a polymer melt temperature of 230 to 235° C. and a nitrogen content of 0.36% (0.18% nitrogen in bis-(carbobenzyl) isopropylamine radicals).

A yarn is spun from the polymer blend employing the equipment and procedure of Example IV. It is dyed to a deep red employing the bath and technique of Example VIII. It possesses good light fastness.

As previously pointed out, the tertiary amino di-acids which are suitable for the purpose of the present invention include any of those which correspond to the following formula:

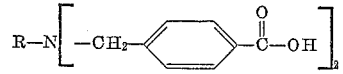

or

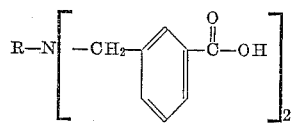

wherein R is a member of the group consisting of an aliphatic radical and a cycloaliphatic radical. Such compounds include those in which the R is alkyl, such as methyl, ethyl, propyl, isopropyl, butyl, amyl, hexyl, lauryl, stearyl, as well as substituted aliphatic radicals, cyclohexyl, substituted cyclohexyl and similar carbocyclic derivatives. Those diacids are preferred wherein the amino substituent "R" is lower alkyl, i.e., it contains no more than about 3 carbon atoms.

While the above examples of condensation polymers within which the bis-(carbobenzyl) tertiary amino radicals may be included are specific to the polyester of terephthalic acid and ethylene glycol, other fiber-forming condensation polymers and copolymers may also be so modified. Among these may be mentioned polyesters produced by polymerizing a diol such as diphenylolpropane, 1,4-bis-(hydroxymethyl)-cyclohexane, resorcinol, a dialkanolamine such as disclosed in United States Patent 2,647,104 or a glycol of the formula:

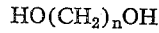

wherein n is an integer from 2 to 10 with terephthalic acid or a mixture of dibasic acids of which terephthalic acid comprises about 90%. Suitable acids for such mixtures with terephthalic acid are hexahydroterephalic, isophthalic, bibenzoic, adipic, sebacic, azelaic, naphthalic, 2,5-dimethylterephthalic, bis-(p-carboxy) phenoxyethane and the like. Polyamides may be modified in similar fashion by including a bis-(carboxybenzyl) tertiary amine as a component in a polyamide preparation. This is illustrated by the following examples.

Example X 25 parts of the adipic acid salt of hexamethylene diamine, 2.1 parts of the bis-(carboxybenzyl) methylamine salt of hexamethylene diamine, 1 part of dilute acetic acid (15 grams of acid/100 ml. of water) and 1 part of water is charged in an autoclave. It is maintained at autogenous pressure while the temperature is slowly (43 minutes) raised to 250° C. At 500 p.s.i. pressure, steam is bled off while heating continues. After 28 minutes at 260° C. pressure is reduced to atmospheric. Heating is continued for 60 minutes with the temperature rising slowly from 260° to 275° C. The pressure is reduced to 0.1 mm. of mercury and the mass is heated an additional 2 hours at 275° C. The product has an inherent viscosity of 0.8 and contains 0.3% tertiary amino nitrogen.

The polymer is spun by extrusion through a five-hole spinneret under a pressure of 100 p.s.i., at a temperature of 260° C. and at a windup speed of 160 feet/minute. It is drawn at room temperature four times its extruded length. It has a tenacity of 3.0 grams per denier and is observed to possess high acid dye affinity.

Example XI

A mixture of 5060 parts of 49.1% aqueous solution of the adipic acid salt of hexamethylenediamine, 58 parts of bis-(m-carboxybenzyl) methylamine, 41.1 parts of aqueous hexamethylenediamine solution (54.8%), and 11.55 parts of aqueous acetic acid (25.2%) is heated in an atmosphere of nitrogen until a total of 1450 parts of water are removed. The mixture is charged into an autoclave and heated to 210° C. over a period of 35 minutes (autogenous pressure of 250 p.s.i.). 34 parts of 20% titanium dioxide slurry is pumped in, and during the next hour the temperature is raised to 245° C. (250 p.s.i. pressure). Pressure is slowly reduced to atmospheric in a period of about 90 minutes during which time the temperature rises to about 275° C. After an additional 30 minutes at 275° C., the polyamide is converted to flake form as described by Graves in United States Patent 2,289,774. The flake is spun to yarn following the teachings of Waltz in United States Patent 2,571,975. A 13-filament yarn is formed which is cold drawn to a final denier of 40 using a draw ratio 3.41. The yarn has a tenacity of 5.2 grams per denier, an elongation of 28%, and a relative viscosity of 36.5 measured at 25° C. on a solution consisting of 5.5 grams of polymer in 50 ml. of formic acid. The yarn has an inherent viscosity of 1.0 and contains 0.12% tertiary amino nitrogen.

Samples of the yarn are dyed using an excess of Anthraquinone Blue SWF, Milling Red SWB, and Pontamine Fast Red 8BLX. Each sample picks up approximately twice as much of the dyestuff as does a control containing no bis-(m-carboxybenzyl) methylamine.

Example XII

An autoclave is charged with 37,300 parts of 48.8% aqueous solution of the adipic acid salt of hexamethylenediamine, 551 parts of bis-(m-carboxybenzyl) cyclohexylamine, 174 parts of hexamethylenediamine, and 84 parts of glacial acetic acid. The autoclave is purged with nitrogen and the temperature raised to 210° C. over 35 minutes as in Example XI. 236 parts of 20% titanium dioxide slurry is pumped in, and the heating is continued as described in Example XI. There is obtained a polyamide having a relative viscosity of 35, measured as in the preceding example, which is spun into filaments according to the procedure of Example XI. The filaments have an inherent viscosity of 1.0 and contain 0.13% tertiary amino nitrogen. When the resulting filaments are dyed using the dyes of Example XI, substantially the same results are obtained as those set forth in that example.

Example XIII

A polyamide filament modified with bis-(m-carboxybenzyl) decylamine is prepared in the manner described in the preceding example, except that 635 parts of the decyl-substituted modifier is used in place of the 551 parts of cyclohexyl-substituted modifier. When the resulting filaments are dyed using the dyes of Example XI, substantially the same results are obtained.

Example XIV

The dry salt prepared from hexamethylenediamine and bis-(p-carboxybenzyl) cyclohexylamine is polymerized by heating for 1 hour at 220° C. in a sealed tube and for 2 hours at 283° C. under nitrogen at atmospheric pressure. The resulting polyamide has an inherent viscosity of 0.4 and contains 3.1% tertiary amino nitrogen. Five (5) parts of this polyamide is mixed with 95 parts of poly(hexamethyleneadipamide), and the mixture is heated under nitrogen at 283° C. until molten and stirred at this temperature for 5 minutes. The resulting polymer blend, containing 0.16% tertiary amino nitrogen, is spun by extrusion through a 5-hole spinneret at 290° C. and is wound up at 200 yards per minute. The resulting yarn, having an inherent viscosity of 1.1, is drawn to 3 times its extruded length. The yarn has a higher affinity for acid dyes than does a control yarn made in the same way from poly(hexamethyleneadipamide) alone.

Example XV

A polyamide is made from hexamethylenediamine and bis-(m-carboxybenzyl) methylamine by the same procedure described in the preceding example for the homopolymer containing tertiary amino nitrogen. The polymer has an inherent viscosity of 0.4 and contains 3.7% tertiary amino nitrogen. Twenty (20) parts of this polymer is mixed with 80 parts of a polyamide made from bis-(p-aminocyclohexyl) methane and azelaic acid. The mixture is heated at 305° C. under nitrogen until molten and then stirred for 5 minutes. The resulting polymer, containing 0.74% tertiary amino nitrogen, is spun and wound up as in the preceding example. The resulting yarn, having an inherent viscosity of 0.9, is drawn 3 times its extruded length around a cylindrical snubbing element heated at 150° C.

One gram of the yarn is scoured and then dyed for an hour at 100° C. in a dye bath consisting of 0.1 gram of Anthraquinone Green GNN dye in 50 ml. of a pH 4 buffer solution. The dyed fiber is a dark shade of green, whereas a control yarn, prepared in the same manner from the unmodified polyamide of bis-(p-aminocyclohexyl) methane and azelaic acid and dyed under the same conditions, is only very slightly tinted.

Example XVI

A mixture of 3,210 parts of the azelaic acid salt of p-xylylenediamine, 3,210 parts of water, 41.5 parts of the hexamethylenediamine salt of bis-(m-carboxybenzyl) methylamine, and 4.46 parts of acetic acid is charged into an autoclave and heated to 210° C. over a period of about 1 hour (autogenous pressure of 250 p.s.i.). 42.1 parts of 20% titanium dioxide slurry is pumped in, and during the next hour the temperature is raised to 285° C. (the autoclave is bled so as not to exceed 300 p.s.i.). Pressure is slowly reduced to atmospheric over a period of about 1 hour, and the batch is then held at 285° C. for 2 additional hours. The polyamide is converted to flake form as described by Graves in United States Patent 2,289,774. The flake is spun to yarn following the teachings of Waltz in United States Patent 2,571,975. The yarn has an inherent viscosity of 0.81 and contains 0.06% tertiary amino nitrogen.

Samples of the yarn are dyed using Anthraquinone Blue SWF, Milling Red SWB, and Pontamine Fast Red 8BLX. Each sample is dyed to a noticeably heavier shade than is a control containing no bis-(m-carboxybenzyl) methylamine.

The inclusion of the bis-(carbobenzyl) tertiary amino radicals in condensation polymers is of particular importance since it provides dye sites for acid and direct dyes to which shaped articles produced from conventional polymers have poor sensitivity. While the addition of any amount of the tertiary amino nitrogen can affect dyeability to some extent, the presence of from about 0.10% to about 0.7% is particularly useful since it gives excellent dyeability. When the radical containing the tertiary amino nitrogen is a part of the chain of a polymer of fiber-forming molecular weight, the presence of from about 0.05% to about 0.5% of tertiary amino nitrogen is generally preferred in providing the advantages of this invention.

The polymers of this invention have inherent viscosities of at least 0.1. Since polymers of fiber-forming molecular weight having desirable properties generally possess inherent viscosities of at least about 0.3, the polymers of this invention having inherent viscosities between 0.1 and 0.3 are useful in the formation of molded articles and are particularly useful for blending with polyamides and polyesters of much higher inherent viscosity, to provide a blend having an inherent viscosity above 0.3 from which fibers of improved dyeability may be obtained. Preferably, the inherent viscosity for the polymers of this invention are from about 0.3 to about 2.0. For fiber production, an inherent viscosity in the range from 0.7 to 1.3 is particularly advantageous for polyamides, and from 0.4 to 0.7 for polyesters.

Inherent viscosity is defined as $$\frac{\ln \eta_r}{c}$$

in which $\eta_r$ is the viscosity of a dilute solution of the polymer divided by the viscosity of the solvent in the same units and at the same temperature, and $c$ is the concentration in grams of the polymer per hundred ml. of solution. The inherent viscosities recorded herein for Examples IV through IX were measured in a solvent mixture consisting of 40 parts by weight of tetrachloroethane and 60 parts by weight of phenol, a mixture frequently used for determination of solution viscosities for polyesters. The inherent viscosities recorded herein for Examples X through XVI were measured in m-cresol, a common solvent for polyamides. The measurements were made at 25° C. at a concentration of 0.5 gram of polymer per hundred ml. of solution.

Bis-(carbobenzyl) tertiary amino radicals can be included as a component of a fiber produced from a condensation polymer by substituting part or all of the acid employed in the polymerization with a bis-(carboxybenzyl) tertiary amine or the amide or ester-forming derivative thereof. Alternatively, a polymer containing the desired radical, which polymer may or may not be fiber-forming, may be blended with a fiber-forming condensation polymer. In such a process the tertiary amine modified polymers are broken up to small particle size in an Abbe cutter and thoroughly mixed with polymer flake. The mixture of polymers is heated until melted in a high vacuum under a nitrogen atmosphere, after which the melt is stirred for 10 to 20 minutes until complete mixture of the polymer is attained. The blending of the polymers may also be achieved through mixing together of the molten polymers at elevated temperatures under a nitrogen atmosphere with thorough stirring.

Polyesters and polyamides containing bis-(carbobenzyl) tertiary amino radicals are sensitive to acid and direct dyes. Among the dyestuffs which are useful are included Anthraquinone Blue SWF (Prototype of C.I. 12), Pontacyl Rubine R (C.I. 179), Du Pont Milling Red SWB (C.I. 430), Anthraquinone Green GN (C.I. 1078), Pontacyl Light Yellow GG (C.I. 636), Pontamine Yellow CH (C.I. 365), Pontamine Fast Red 8BL (C.I. 278), and Pontamine Fast Orange EGL (Prototype of C.I. 72).

As is known in the art, polyamides normally prepared from adipic acid and hexamethylenediamine contain about 40–45 equivalents of primary amine groups per million grams of polymer. This level of basicity provides some dyeability with acid dyes. As is also known in the art, this dyeability can be increased somewhat by employing a slight excess of hexamethylenediamine so that an amine end level up to about 75–100 equivalents per million grams is obtained but significantly higher levels are not desirable as they cause excessive reduction in molecular weight and generally poor yarn processability. The use of the high levels of amine ends of the prior art, however, can be combined with the use of the bis-(carboxybenzyl) tertiary amines of the present invention to achieve enhanced dyeability without the undesirable loss in molecular weight and processability.

Many other equivalent modifications will be obvious to those skilled in the art from a reading of the above description without a departure from the inventive concept.

This application is a continuation-in-part of abandoned application Serial No. 730,547, filed April 24, 1958, which is a continuation-in-part of abandoned application Serial No. 472,219, filed November 30, 1954.

What is claimed is:

1. A synthetic linear condensation polymer selected from the group consisting of (A) a polycarbonamide wherein the recurring amide linkages are an integral part of the polymer chain, and (B) a polyester of a diol and a member selected from the group consisting of terephthalic acid and a mixture of dicarboxylic acids of which terephthalic acid comprises at least about 90%, said condensation polymer having an inherent viscosity of at least about 0.1 and containing as an integral part of the polymer chain a divalent radical of the formula:

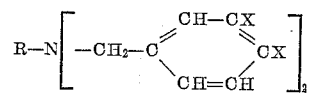

wherein one X is H and the other is

and R is selected from the group consisting of an aliphatic and a cycloaliphatic radial and wherein said divalent radical is attached into the polymer chain by the

linkages, the tertiary amino nitrogen of said divalent radical being present in the amount of from about 0.05% to about 4.3% by weight of said condensation polymer.

2. A synthetic fiber-forming linear condensation polymer selected from the group consisting of (A) a polycarbonamide wherein the recurring amide linkages are an integral part of the polymer chain and (B) a polyester of a diol and a member selected from the group consisting of terephthalic acid and a mixture of dicarboxylic acids of which terephthalic acid comprises at least about 90%, said condensation polymer having an inherent viscosity of at least about 0.3 and containing as an integral part of the polymer chain a divalent radical of the formula:

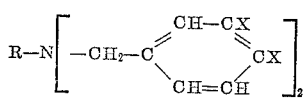

wherein one X is H and the other is

and R is selected from the group consisting of an aliphatic and a cycloaliphatic radical and wherein said divalent radical is attached into the polymer chain by the

linkages, the tertiary amino nitrogen of said divalent radical being present in the amount of from about 0.05% to about 4.3% by weight of said condensation polymer.

3. A fiber formed from the composition of claim 2.

4. A fiber-forming synthetic linear condensation polycarbonamide wherein the recurring carbonamide linkages are an integral part of the polymer, said polycarbonamide having an inherent viscosity of at least about 0.3 and containing as an integral part of the polymer chain a divalent radical of the formula:

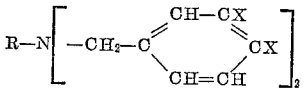

wherein one X is H and the other is

and R is an aliphatic radical and wherein said divalent radical is attached into the polymer chain by the

linkages, the tertiary amino nitrogen of said divalent radical being present in the amount of from about 0.05% to about 0.5% by weight of said polycarbonamide.

5. A fiber formed from the composition of claim 4.
6. The composition of claim 4 wherein said polycarbonamide is the polyamide of hexamethylene diamine and adipic acid.
7. A fiber-forming synthetic linear condensation polycarbonamide where the recurring carbonamide linkages are an integral part of the polymer, said polycarbonamide having an inherent viscosity of at least about 0.3 and containing as an integral part of the polymer chain a divalent radical of the formula:

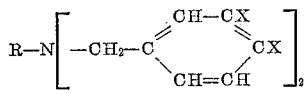

wherein one X is H and the other is

and R is a cycloaliphatic radical and wherein said divalent radical is attached into the polymer chain by the

linkages, the tertiary amino nitrogen of said divalent radical being present in the amount of from about 0.05% to about 4.3% by weight of said polycarbonamide.

8. The composition of claim 7 wherein said polycarbonamide is the polyamide of hexamethylene diamine and adipic acid.
9. A fiber-forming synthetic linear condensation polyester of a diol and dicarboxylic acid comprised of at least 90% terephthalic acid, said polyester having an inherent viscosity of at least about 0.3 and containing as an integral part of the polymer chain a divalent radical of the formula:

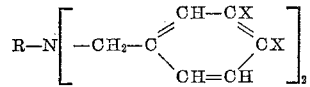

wherein one X is H and the other is

and R is an aliphatic radical and wherein said divalent radical is attached into the polymer chain by the

linkages, the tertiary amino nitrogen of said divalent radical being present in the amount of from about 0.05% to about 0.5% by weight of said polyester.

10. A fiber formed from the composition of claim 9.
11. The composition of claim 9 wherein said polyester is the polyester of ethylene gylcol and terephthalic acid.
12. A fiber-forming synthetic linear condensation polyester of a diol and a dicarboxylic acid comprised of at least 90% terephthalic acid, said polyester having an inherent viscosity of at least about 0.3 and containing as an integral part of the polymer chain a divalent radical of the formula:

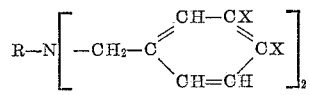

wherein one X is H and the other is

and R is a cycloaliphatic radical and wherein said divalent radical is attached into the polymer chain by the

linkages, the tertiary amino nitrogen of said divalent radical being present in the amount of from about 0.05% to about 4.3% by weight of said polyester.

13. The composition of claim 12 wherein said polyester is the polyester of ethylene glycol and terephthalic acid.
14. A synthetic linear condensation polymer selected from the group consisting of (A) a polycarbonamide wherein the recurring amide linkages are an integral part of the polymer chain, and (B) a polyester of a diol and a member selected from the group consisting of terephthalic acid and a mixture of dicarboxylic acid of which terephthalic acid comprises at least about 90%, said condensation polymer having an inherent viscosity of at least about 0.1 and containing as an integral part of the polymer chain a divalent radical of the formula:

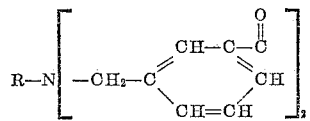

wherein R is selected from the group consisting of an aliphatic and a cycloaliphatic radical and wherein said divalent radical is attached into the polymer chain by the

linkages, the tertiary amino nitrogen of said divalent radical being present in the amount of from about 0.05% to about 4.3% by weight of said condensation polymer.

References Cited in the file of this patent
UNITED STATES PATENTS

| | | |
|---|---|---|
| 2,274,831 | Hill | Mar. 3, 1942 |
| 2,739,958 | Lincoln et al. | Mar. 27, 1956 |